United States Patent
Servan-Schreiber et al.

(10) Patent No.: US 6,892,354 B1
(45) Date of Patent: *May 10, 2005

(54) METHOD OF ADVERTISING ON LINE DURING A COMMUNICATION LINK IDLE TIME

(75) Inventors: Franklin Servan-Schreiber, New York, NY (US); Salvatore Cataudella, Brooklyn, NY (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/839,883

(22) Filed: Apr. 16, 1997

(51) Int. Cl.[7] ............. G09G 5/00; G06F 17/60
(52) U.S. Cl. ............ 715/733; 715/744; 715/804; 715/962; 705/14; 709/203
(58) Field of Search ............ 715/733, 744–747, 715/804, 759, 962, 501.1; 705/26, 14; 709/203, 217; 345/329, 335, 357, 346, 332, 962; 395/200.33, 200.47; 707/501

(56) References Cited

U.S. PATENT DOCUMENTS

| | | | | |
|---|---|---|---|---|
| 5,105,184 A | * | 4/1992 | Pirani et al. | 345/115 |
| 5,305,195 A | * | 4/1994 | Murphy | 705/1 |
| 5,572,643 A | | 11/1996 | Judson | 395/200.48 |
| 5,737,619 A | * | 4/1998 | Judson | 707/500 |
| 5,740,549 A | * | 4/1998 | Reilly et al. | 705/14 |
| 5,781,894 A | * | 7/1998 | Petrecca et al. | 705/14 |
| 5,854,897 A | * | 12/1998 | Radziewicz et al. | 395/200.54 |
| 5,913,040 A | * | 6/1999 | Rakavy et al. | 709/232 |
| 5,946,646 A | * | 8/1999 | Schena et al. | 702/177 |
| 5,959,623 A | * | 9/1999 | Van Hoff et al. | 345/333 |

FOREIGN PATENT DOCUMENTS

| | | |
|---|---|---|
| EP | 0 749 081 | 12/1996 |
| WO | WO 93/19427 | 9/1993 |

OTHER PUBLICATIONS

Patent Abstracts of Japan vol. 015, No. 476 (E–1140), Dec. 4, 1991 of JP 03 204 259, (Nippon Telegr & Teleph Corp), Sep. 5, 1991, pp. 365–368.

* cited by examiner

*Primary Examiner*—Sy D. Luu
(74) *Attorney, Agent, or Firm*—Frommer Lawrence & Haug LLP; William S. Frommer

(57) ABSTRACT

Method of advertising on-line during, for example, a world wide web session is provided by downloading full page advertisements from a predetermined site (e.g., remote server) to a user's computer during a communication link idle time. The downloaded advertising data are stored and then displayed when the user makes a request to retrieve new data, for example, a hyperlink request to a selected remote server. The advertisement remains displayed while the connection to the selected remote server is made and at least until a portion of new content data is transmitted to the user terminal.

15 Claims, 9 Drawing Sheets

METHOD OF ADVERTISING ON LINE DURING A COMMUNICATION LINK IDLE TIME

BACKGROUND OF THE INVENTION

The present invention relates to method of advertising on-line and, more particularly, to a method for providing advertisements during a computer on-line session.

Currently, advertising during computer on-line sessions (e.g., "world-wide web" or simply "web" sessions) is accomplished by displaying so-called "banners" on the top of a "web" page. Advertisements also are provided as "buttons" or small square banners in particular areas of a web page currently being displayed. Such banner or button advertisements provide relatively little information to the user due to their small size, but operate to "hyperlink" to the advertiser's home web page when the advertisement is "clicked" on by means of a mouse.

One problem with these types of on-line advertisements is that they convey very little information, as previously mentioned. Another problem with such advertisements is that they must be included within the particular web pages that are viewed by users and, thus, advertisements included in web pages that are viewed rarely have little advertising value.

OBJECTS OF THE INVENTION

Therefore, it is an object of the present invention to provide method of advertising on-line which overcomes the shortcomings of current advertising techniques.

Another object of the present invention is to provide a technique for advertising on-line which provides for the display of full page advertisements.

A further object of the present invention is to provide a technique for providing advertisements to users of internet services regardless of the particular web pages that are viewed by those users.

Various other objects, advantages and features of the present invention will become readily apparent to those of ordinary skill in the art, and the novel features will be particularly pointed out in the appended claims.

SUMMARY OP THE INVENTION

In accordance with one embodiment of the present invention, method is provided for ascertaining when the communication link between a user terminal and a service provider is idle, transmitting to the user terminal advertising data (e.g., an advertising page) representing an advertisement during the ascertained communication idle time, and displaying at the user terminal the advertisement that is represented by the transmitted advertising data when a request to display different information (e.g., to receive a new content page) is made at the user terminal.

As one aspect of the present invention, the advertisment is displayed when a request to download new information (e.g., a new content page) is made, the request is transmitted to the service provider, and the requested information is transmitted from, for example, a remote server to the user terminal, all occuring while the advertisement is displayed.

As another aspect of the present invention, the advertisement that is transmitted to the user terminal corresponds to that information (i.e., content pages) that was previously displayed at the user terminal.

As a further aspect of the present invention, data indicating that the user terminal communication link is idle is transmitted from the user terminal to a remote server, and that remote server transmits the advertising data to the user terminal.

As yet another aspect of the present invention, the transmitted advertisement is displayed when a connection to a selected remote server is requested at the user terminal, and remains displayed while the connection is being made.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
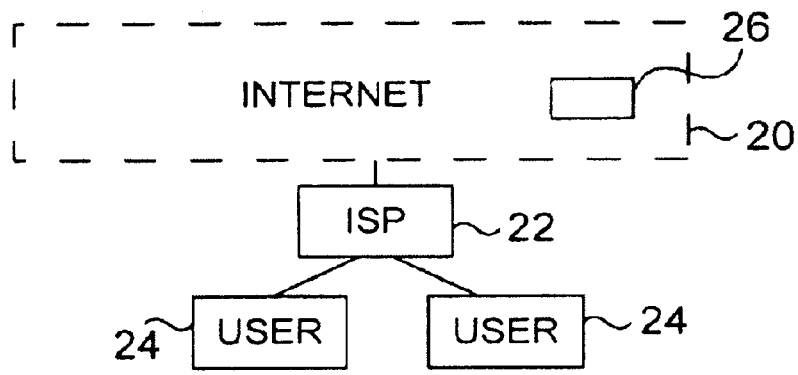
FIG. 1 is a schematic illustration used to explain how individual users access the Internet.

Referring now to the drawings, FIG. 1 is a schematic illustration showing the relationship between the Internet 20, an Internet service provider (ISP) 22 and users 24 that are serviced by ISP 22. During a typical on-line session, a user 24 (also identified herein as "user terminal") accesses via a computer modem the particular ISP 22 to which the user subscribes, and the ISP operates to allow user 24 to communicate with a desired web site, for example, the Sony home page web site 26, which is considered to be a part of the world-wide web of the Internet 20.

In accordance with the present invention, full page advertisements are downloaded from a particular web site to user terminal 24 after a "content" page has been downloaded and is currently being displayed to the user, such content page being, for example, the home page of a selected web site. Upon downloading of the advertisement, the advertisement is stored in the memory of the user's computer and remains un-displayed until the user creates a so-called http connection. In other words, the advertisement (also identified herein as "advertising page") is downloaded (or pushed) in the background while the user is reading a content page (i.e., while the user's computer is idle). When the user "clicks" on a hyperlink or manually enters the address of the web site to be accessed, the downloaded advertising page immediately is displayed and remains displayed until the http connection is established with the hyperlinked page and that hyperlinked page begins to download.

Figure 2:
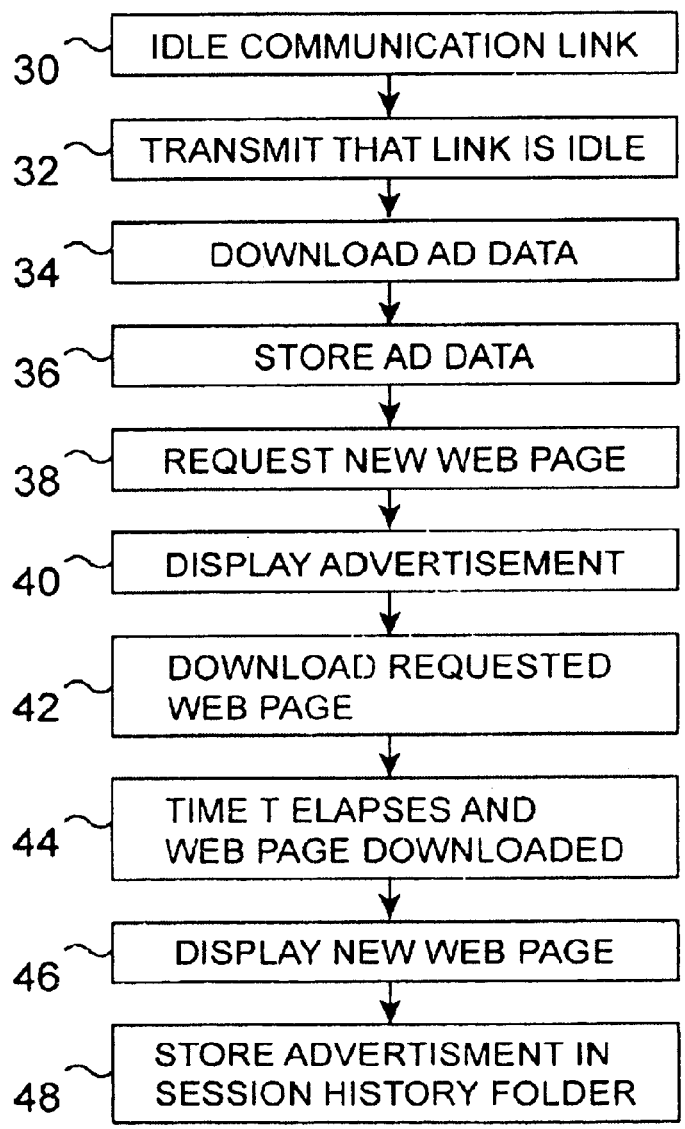
FIG. 2 is a flow chart of method of advertising on-line in accordance with the present invention.
Figure 3:
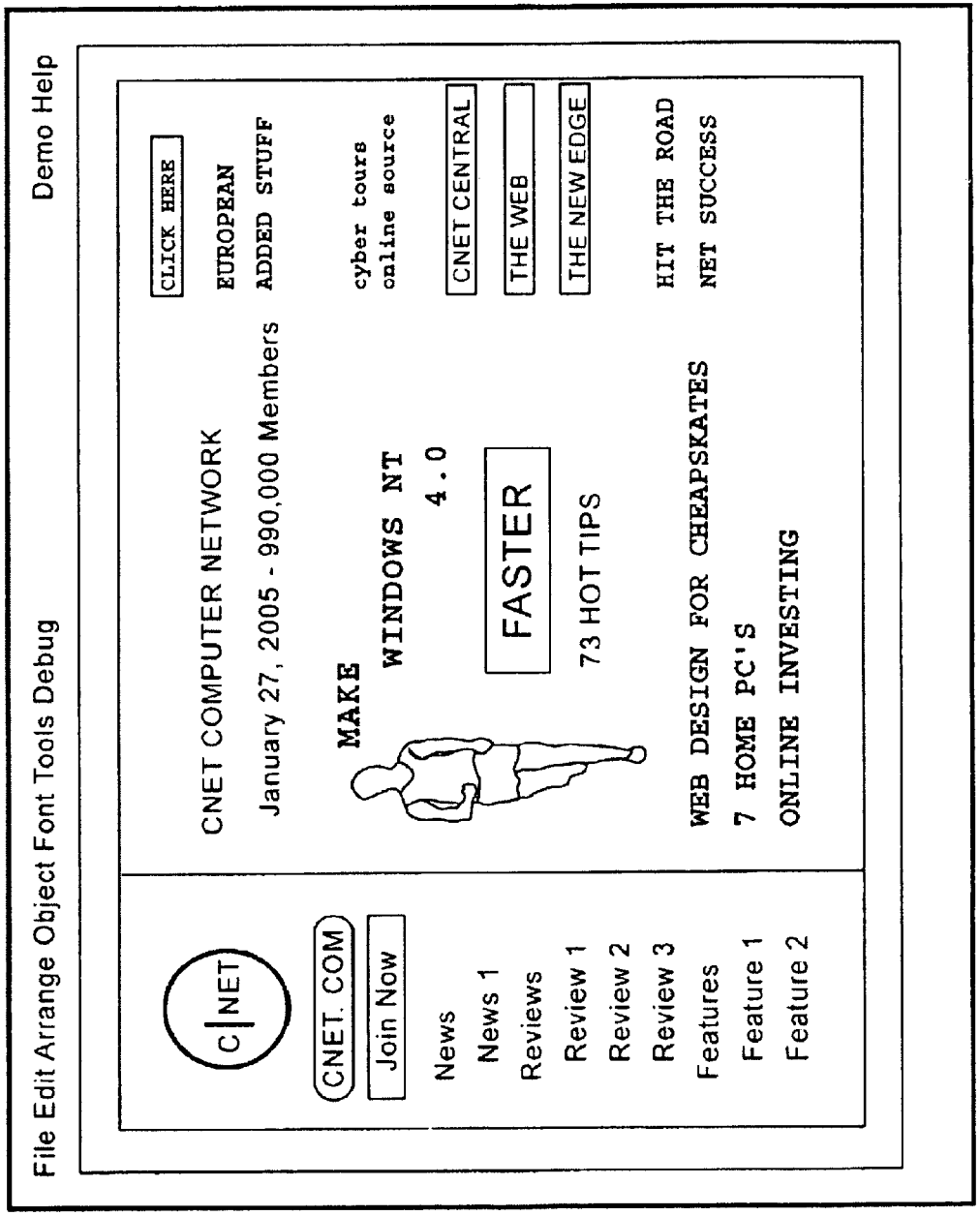
FIG. 3 is a schematic illustration of a full-screen display of an active web page.

FIG. 2 is a flow chart of method of advertising on-line in accordance with the present invention. When it is determined that the user's communication link is idle, at instruction 30, the user's computer communicates to ISP 22 that its communication link is idle at instruction 32, at which time, an advertising page (AD data) is supplied from a particular web site (e.g., web site 26) via ISP 22 to user 24 at instruction 34. In a preferred embodiment of the present invention, the user's web browser includes software that carries out the functions of determining whether its communication link is idle and communicating to a remote server the fact that its communication link is idle. During such idle time, the user's web browser accesses (i.e., links to) a preprogrammed web site (e.g., remote server 26), and upon accessing the remote server, appropriate transmissions are supplied from user 24 thereto, at which time, the remote server transmits to user 24 the advertising page that is to be displayed. The received advertising page is stored (cached) in the computer's memory or hard disk at instruction 36. An exemplary content page that a user may be viewing during such idle time is shown in FIG. 3. Of course, the user may be viewing any content page supplied from any remote server, not necessarily and, in actuality, most likely not the same remote server that supplied the advertising page.

Figure 4:
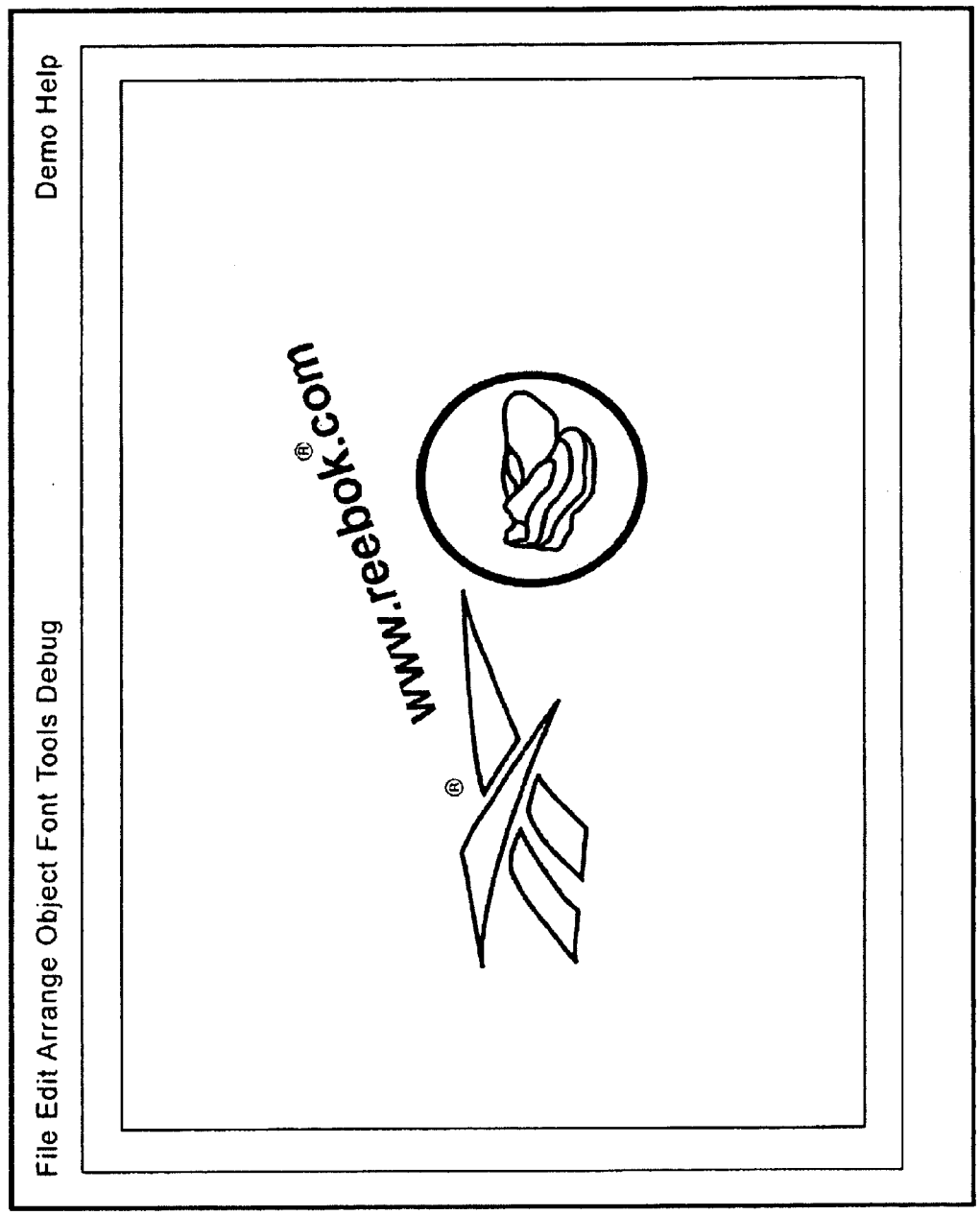
FIG. 4 is a schematic illustration of an advertisement that is displayed in accordance with the present invention.
Figure 5A:
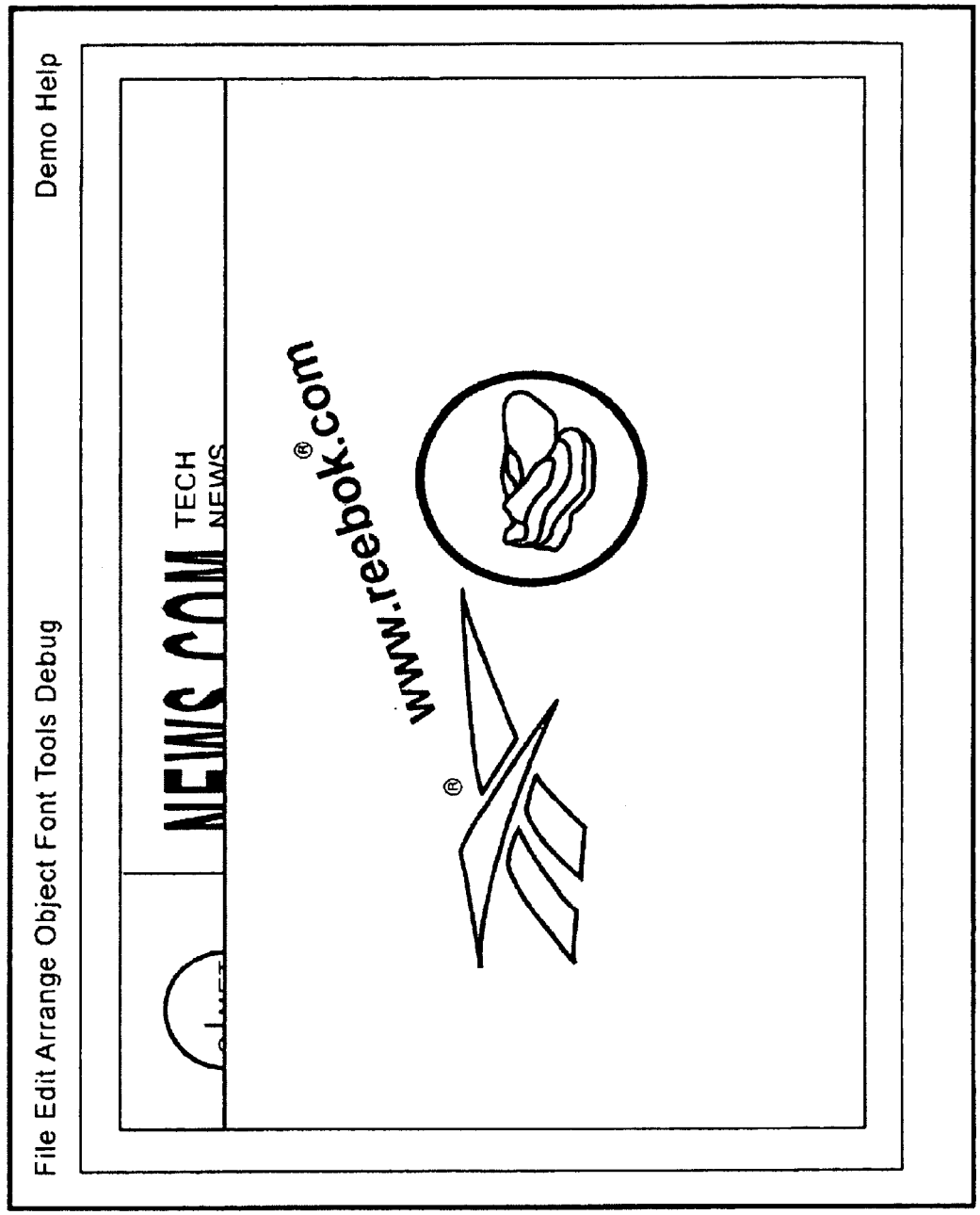
FIGS. 5A–5D are schematic illustrations of a display showing partially the advertisement of FIG. 4 in accordance with the present invention.
Figure 5B:
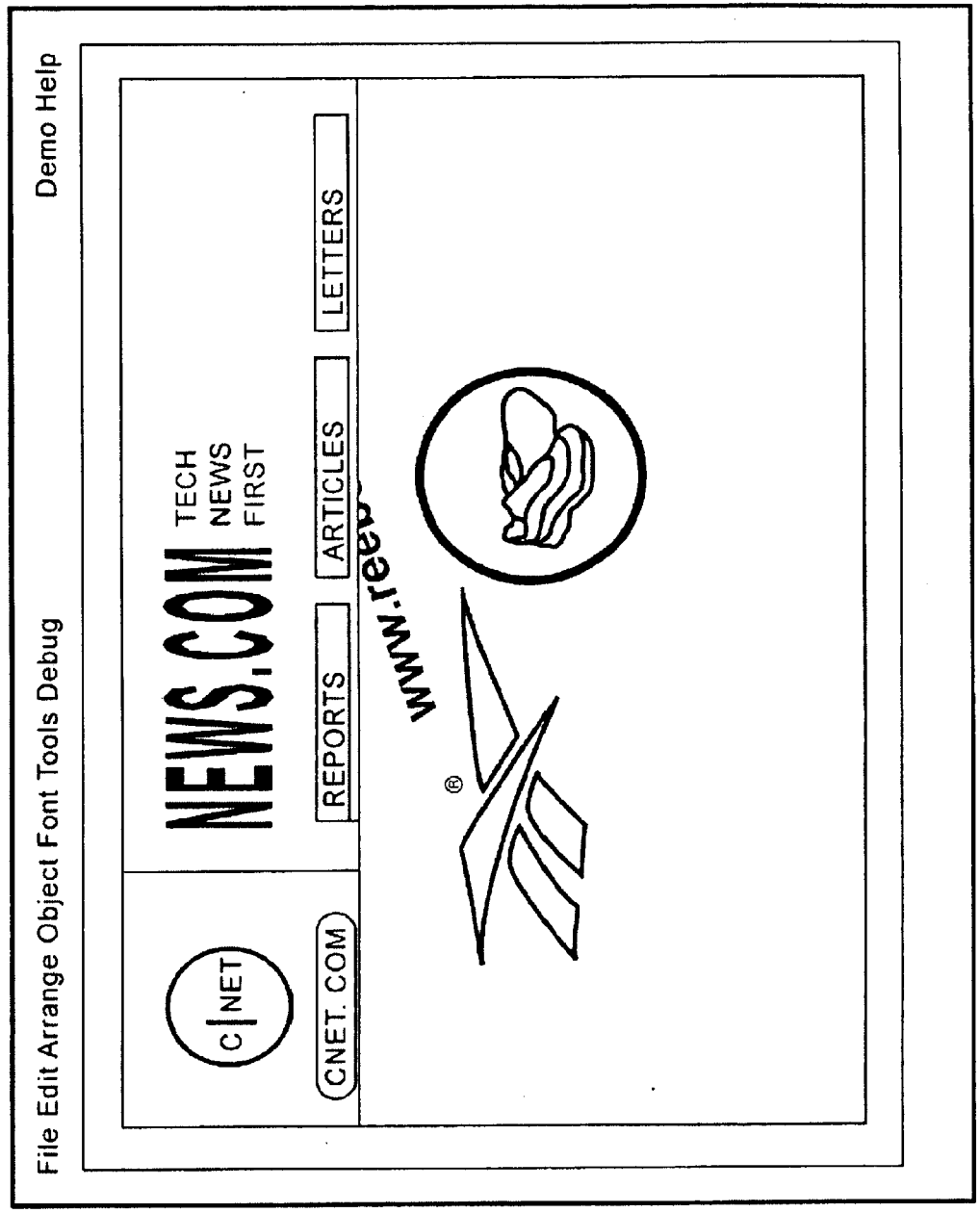
Figure 5C:
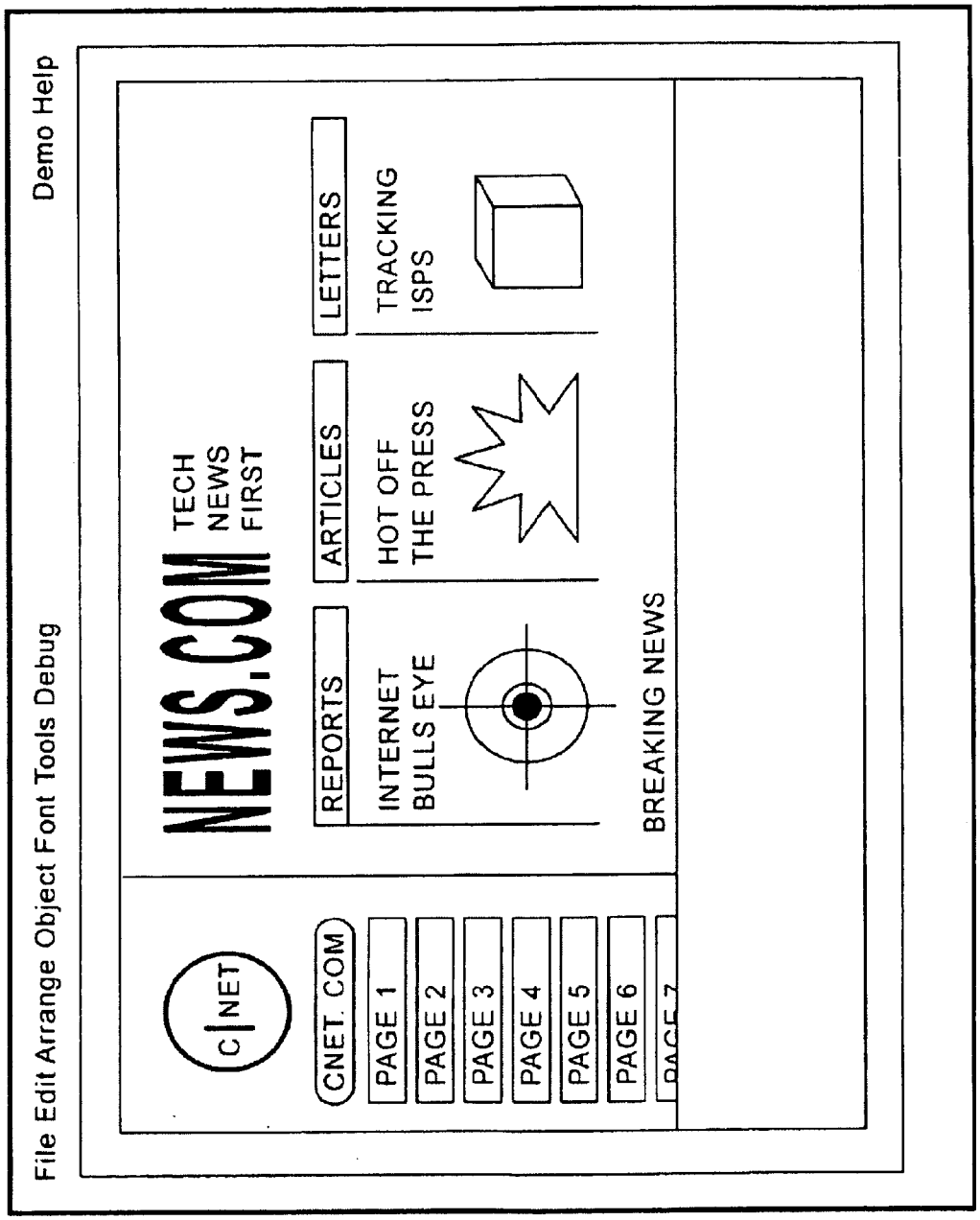
Figure 5D:
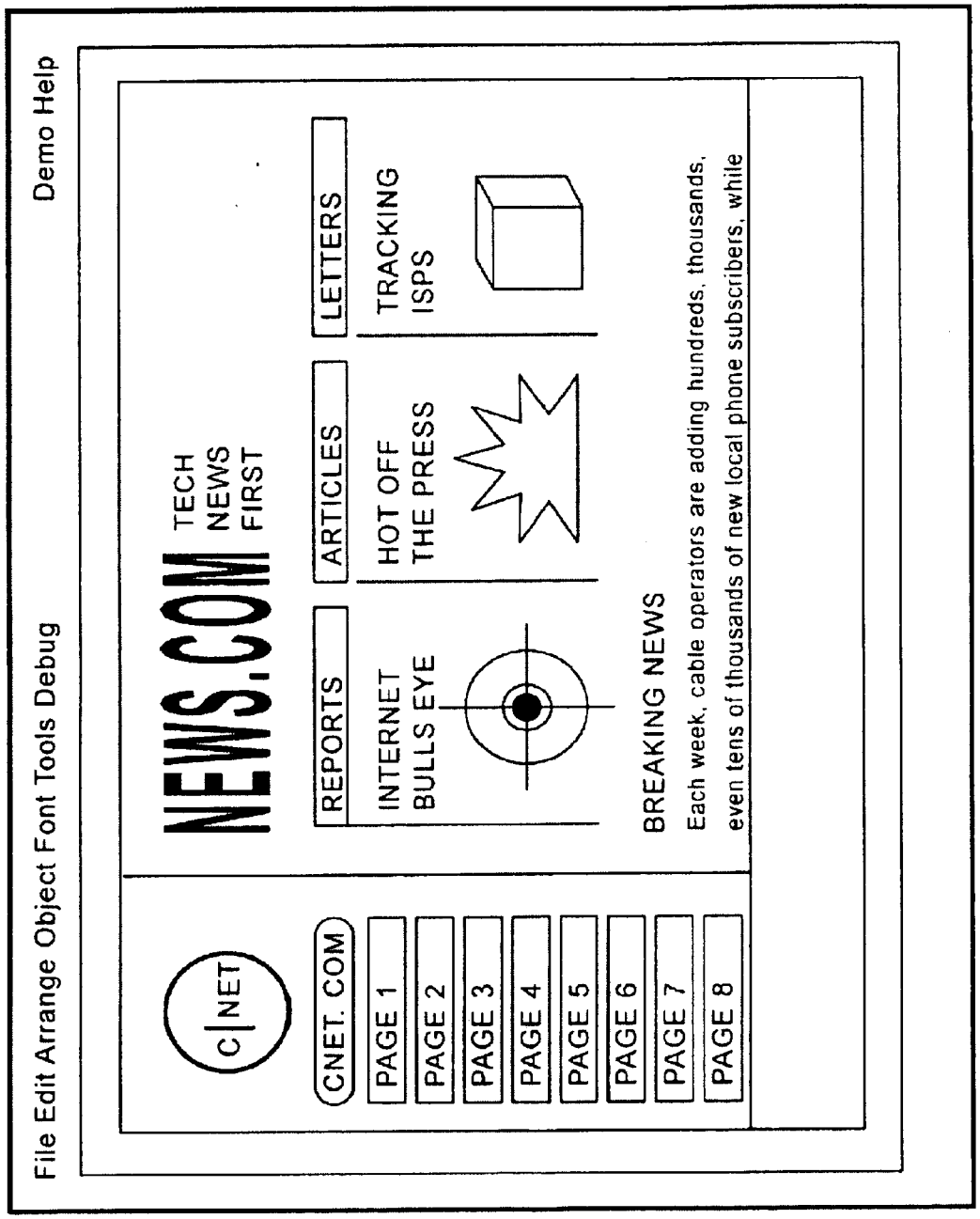
Figure 6:
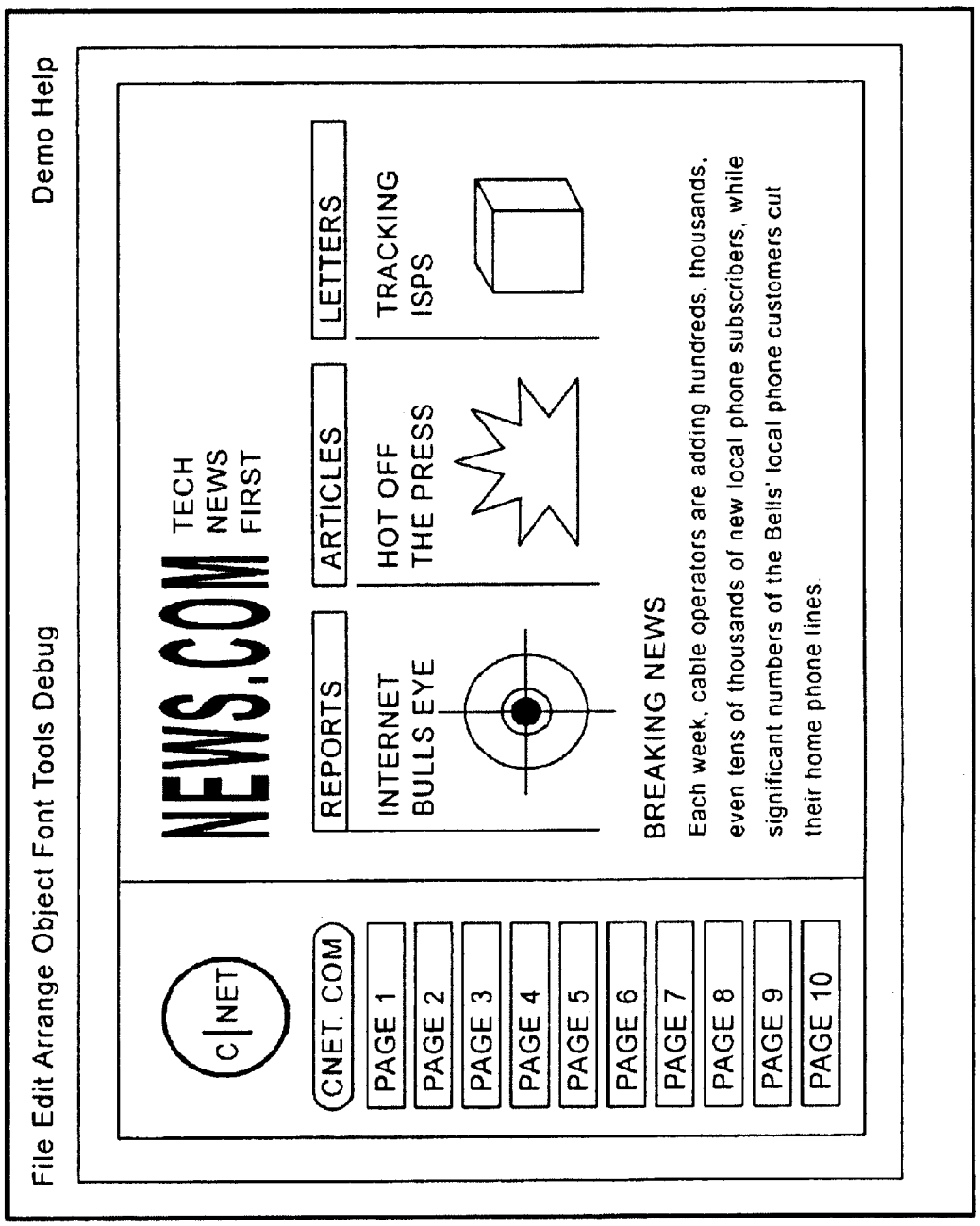
FIG. 6 is a schematic illustration of a new web page that is fully downloaded and fully displayed after the display of an advertisement in accordance with the present invention.
Figure 7:
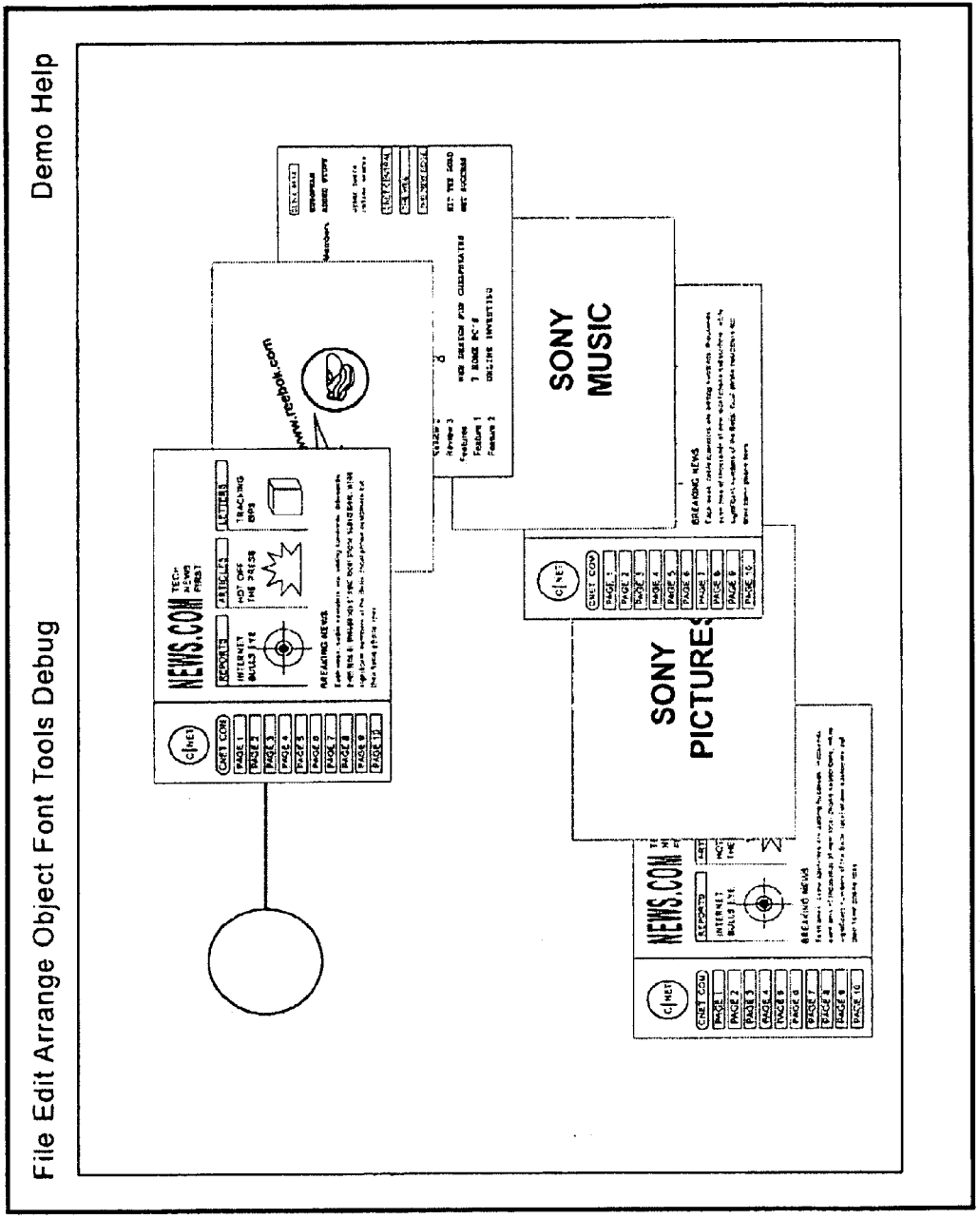
FIG. 7 is a schematic illustration of a view of an overall web session illustrating the advertisements that are displayed in accordance with the present invention.

When the user clicks on a link from the currently displayed web page in order to request that a new web page be downloaded and displayed (from any particular remote server), as indicated at instruction 38, the new http connection then is established, and simultaneously, the cached advertising page, for example, such as shown in FIG. 4, is displayed for a minimum predetermined amount of time T or until the new web page "sufficiently" is downloaded, whichever is greater, at instruction 40. At this time, the requested web page is downloaded at instruction 42, and when it is determined that the new web page is "sufficiently" downloaded after the predetermined time T has elapsed, as determined at instruction 44, the new web page is displayed at instruction 46. As shown successively in FIGS. 5A–5D, after the new page is sufficiently downloaded, the new page replaces the displayed advertising page in the manner shown. When the new web page is fully downloaded, it is fully displayed, such as shown in FIG. 6. The advertising page then is saved in the web session history folder, along with the other saved web pages, at instruction 48, such as schematically shown in the web session zooming page shown in FIG. 7.

As previously discussed, a request to download a new web page is made by the user at instruction 38, at which time, the new http connection is established. If such a request was made prior to the transmission of all of the data of the advertising page (from, for example, web site 26), then the advertising page is not displayed (at instruction 40) when the request to receive a new content web page is made by the user (at instruction 38). Instead, the remainder of the advertising page is transmitted to user 24 (and then stored therein) at the next instance the transmission link becomes idle (i.e., at instructions 32–36). However, to prevent the non-display of an advertising page between the display of content web pages, two or more advertising pages are downloaded to user 24 at instruction 34, assuming there is adequate time prior to a user request to receive a new content web page. Then, one or more downloaded advertising pages are displayed until the new content web page is "sufficiently" downloaded, and the not yet displayed downloaded advertising pages remain stored in user terminal 24's memory (RAM, hard-drive, etc.) and remain undisplayed until the next user request to retrieve a new content web page. Thus, there is reserve of advertising pages for display in the event there is an http request before an entire advertising page is downloaded.

In a preferred embodiment of the present invention, the advertising technique described herein is implemented by means of a zooming web browser which essentially "slips" each advertising page between two web content pages as the user hyperlinks from one page to another and, thus, the advertising pages remain as part of the session history. The session history may be displayed in the form of a tree, a spiral, a timeline, a circle or any other representation of a web session that may be provided using a zooming function. These zooming web browsers allow the user to view selected pages from the web session history folder, such selected pages being either content pages or advertising pages.

From the foregoing discussion, it is seen that the present invention provides a process of "pushing" advertising data to a client (or user) when client communication activity is idle, and then displaying that advertising data on the client's monitor during the down time that immediately follows a new network connection request. Hence, neither the advertising data download time nor the advertisement display time utilizes any of the client's communication time. Often, such advertising data is displayed during a time when the client's monitor would otherwise be blank.

The present invention may be applied to a web session, such as previously discussed, wherein an advertising page is downloaded to a user over the Internet while the user is reading a downloaded page, and the downloaded advertising page then is displayed when the user hyperlinks to another page. Also, as previously discussed, the advertising page is displayed for a minimum time T or until a new page is sufficiently downloaded, whichever is greater. Such minimum time can be preset to any amount of time, for example, two seconds, five seconds, ten seconds, etc. In an alternative embodiment of the present invention, two (or more) advertising pages are downloaded during the idle time, wherein each downloaded advertising page is displayed successively for a period of at least, for example, four seconds, for a minimum advertising display time of 8 seconds. Still further, additional advertising pages may be displayed during the web page download time if such download time is unusually long. Of course, any variation of the above also is possible.

Each advertising page that is downloaded to a user's computer is downloaded from a predetermined web site, such web site generally having no relationship with the particular content pages that are retrieved and displayed to the user. This advertising data web site may supply to users selected advertising pages in a manner similar to that of television and radio. That is, "advertising time" is purchased by sponsors and the sponsors' advertisements are downloaded to the users during the above-discussed idle times. In an alternative embodiment of the present invention, the specific advertising pages that are downloaded to a particular user are a function of that user's preferences as determined by, for example, the particular content pages that are retrieved and viewed by the user. Thus, advertisements directed to, for example, food items are downloaded to users viewing cooking-related content pages. Of course, other information including statistical profiles of users, what items are searched for in search engines, etc., may be used to determine which advertising pages are to be downloaded.

In a further alternative embodiment of the present invention, advertising data is downloaded during idle times in the manner previously discussed, but the advertising data is displayed when the user clicks or zooms to a specific content space of the displayed web page. Thus, advertisements "pop up" in between any type of request for information, whether such request is a hyperlink request, a zoom request, etc. Such may be applied during whether a connection is made to the Internet or to a local area network. Further, advertising data could be provided to the user in this manner when data is being downloaded from a CD-ROM or other record medium. Thus, advertising pages downloaded during idle times may be displayed to a user during any type of action that requires at least a short amount of "wait" time.

While the present invention has been particularly shown and described in conjunction with preferred embodiments thereof, it will be readily appreciated by those of ordinary skill in the art that various changes may be made without departing from the spirit and scope of the invention. For example, while the present invention has been described as downloading full page advertisements during communication idle time, the present invention is not limited to full page advertisements and may be applied to the downloading of partial pages of advertisements or any other form thereof, including, for example, advertising pages having more than one advertisement thereon.

As another example, although the present discussion is directed to a web browser that communicates to a remote server when it is idle, the present invention is not limited solely to providing the means for carrying out the present invention at the user's computer and may be provided at the internet service provider wherein the internet service provider ascertains when a user's communication link is idle and it is the internet service provider that automatically accesses (without the user's knowledge) the particular remote terminal that will download advertising data to the user.

Still further, although the present invention has been described as accessing a remote server which then downloads to the user advertising data, the present invention is not limited solely to the downloading of advertising data from a remote server and may be applied to the case when the internet service provider itself downloads to the user advertising data without the need to access a remote server on the internet.

Therefore, it is intended that the appended claims be interpreted as including the embodiments described herein, the alternatives mentioned above, and all equivalents thereto.

What is claimed is:

1. A method of advertising on-line, comprising the steps of:
ascertaining a time when a communication link between a user terminal and a service provider is idle;
transmitting to said user terminal advertising data representing an advertisement during the ascertained communication idle time; and
displaying said advertisement represented by the transmitted advertising data which has already been transmitted, after a request to display requested non-advertising information, which is different from said advertising data, is made at said user terminal, said step of displaying said advertisement being carried out during a time when the requested information is being transmitted, this time being different from said communication idle time and until a plurality of portions, where each portion is less than all of the requested non-advertising information, is transmitted, wherein each portion of the requested non-advertising data that is transmitted replaces an equivalent portion of the advertising data on a display screen.

2. The method of claim 1, further comprising the step of storing the transmitted advertising data in a memory of said user terminal; and wherein said step of displaying is carried out by retrieving from the memory the stored advertising data and displaying the advertisement represented by the retrieved advertising data when said request is made.

3. The method of claim 1, wherein said step of displaying is carried out for a predetermined time.

4. The method of claim 1, wherein said step of displaying is carried out when a request to download new information is made; said method further comprising the step of transmitting to said service provider, during a time when said advertisement is being displayed, a request to receive the requested information.

5. The method of claim 4, further comprising the steps of transmitting to said user terminal, during said time when said advertisement is being displayed, the requested information in response to the transmission of the request by said user terminal.

6. The method of claim 5, further comprising the step of displaying the transmitted requested information simultaneously with the advertisement as said requested information is transmitted.

7. The method of claim 4, wherein the step of displaying said advertisement is carried out until a substantial portion of the requested information is transmitted and a predetermined amount of display time of said advertisement has passed.

8. The method of claim 1, wherein said advertising data transmitted to said user terminal represents an advertisement that corresponds to information previously displayed at said user terminal.

9. The method of claim 1, further comprising the step of transmitting from said user terminal to a predetermined remote server data indicating that the communication link of said user terminal is idle; and wherein said step of transmitting the advertising data is carried out by said predetermined remote server.

10. The method of claim 9, further comprising the step of requesting at said user terminal a connection to a selected remote server; and wherein said step of displaying said advertisement is carried out in response to the connection request.

11. The method of claim 10, further comprising the steps of transmitting to said service provider the connection request; and connecting said user terminal with said selected remote server; and wherein said advertisement remains displayed while the connection request is transmitted and the connection between said user terminal and said selected remote server is made.

12. The method of claim 11, further comprising the step of transmitting from said selected remote server to said user terminal content data representing a content page to be displayed; and wherein said step of displaying said advertisement is carried out at least until a displayable portion of said content data is transmitted.

13. The method of claim 12, wherein said step of displaying said advertisement is carried out by displaying said transmitted content data simultaneously with a portion of said advertisement when a substantial amount of said content data is transmitted to said user terminal.

14. The method of claim 12, wherein said predetermined remote server transmits to said user terminal advertising data representing an advertisement corresponding to contents of content pages previously displayed at said user terminal.

15. The method of claim 10, wherein said predetermined remote server that transmitted to said user terminal said advertising data is different from said selected remote server.

* * * * *